(12) United States Patent
Hovanski et al.

(10) Patent No.: US 8,434,661 B2
(45) Date of Patent: May 7, 2013

(54) FRICTION STIR WELDING TOOL AND PROCESS FOR WELDING DISSIMILAR MATERIALS

(75) Inventors: Yuri Hovanski, West Richland, WA (US); Glenn J. Grant, Benton City, WA (US); Saumyadeep Jana, Richland, WA (US); Karl F. Mattlin, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 61 days.

(21) Appl. No.: 13/523,112

(22) Filed: Jun. 14, 2012

(65) Prior Publication Data

US 2012/0273113 A1    Nov. 1, 2012

Related U.S. Application Data

(62) Division of application No. 12/818,739, filed on Jun. 18, 2010, now abandoned.

(51) Int. Cl.
*B23K 20/00* (2006.01)
*B23K 20/12* (2006.01)
(52) U.S. Cl.
USPC .......... 228/112.1; 228/113; 228/114; 228/2.1
(58) Field of Classification Search ............... 228/112.1, 228/113, 114, 2.1
See application file for complete search history.

(56) References Cited

U.S. PATENT DOCUMENTS

| 5,718,366 | A | 2/1998 | Colligan et al. |
| 7,198,189 | B2 | 4/2007 | Stol et al. |
| 7,255,258 | B2 | 8/2007 | Burford et al. |
| 7,401,723 | B2 | 7/2008 | Stol et al. |
| 7,641,096 | B2 | 1/2010 | Burton et al. |
| 2007/0241163 | A1* | 10/2007 | Valant et al. ................... 228/2.1 |

OTHER PUBLICATIONS

Chen, Y.C., et al., "Friction Stir Lap Welding of Magnesium Alloy and Zinc-Coated Steel," Materials Transactions, 2009, 2598-2603 pps., vol. 50, No. 11, The Japan Institute of Metals, Japan.
Chen, Y. C., et al., Effect of Tool Geometry on Microstructure and Mechanical Properties of Friction Stir Lap Welded Magnesium Alloy and Steel, Materials and Design, 30, 2009, pp. 3913-3919.
Jana, S., et al., Friction Stir Lap Welding of Magnesium Alloy to Steel: A Preliminary Investigation, Metallurgical and Materials Transactions A, vol. 41A, Dec. 2010, pp. 3173-3182.
Wei, Y., et al., Microstructures and Mechanical Properties of Magnesium Alloy and Stainless Stell Weld-Joint Mad by Friction Stir Lap Welding, Materials and Design, 33, 2012, pp. 111-114.

(Continued)

*Primary Examiner* — Erin Saad
(74) *Attorney, Agent, or Firm* — James D. Matheson

(57) ABSTRACT

A friction stir welding tool and process for lap welding dissimilar materials are detailed. The invention includes a cutter scribe that penetrates and extrudes a first material of a lap weld stack to a preselected depth and further cuts a second material to provide a beneficial geometry defined by a plurality of mechanically interlocking features. The tool backfills the interlocking features generating a lap weld across the length of the interface between the dissimilar materials that enhances the shear strength of the lap weld.

23 Claims, 7 Drawing Sheets

OTHER PUBLICATIONS

Jana, S., et al., TMS 2011 104th Annual Meeting & Exhibition, Feb. 27-Mar. 3, 2011, San Diego, Convention Center, San Diego, California, USA, Annual Meeting Final Program Cover Sheet and p. 258, Paper No. 4 of presentation "Friction Stir Welding and Processing VI: Aluminum and Magnesium Alloys II" 3.05 p. m., entitled Effect of Tool Feature on the Joint Strength of Dissimilar Friction Stir Lap Welds.

Arora, A., et al., Toward optimum friction stir welding tool shoulder diameter, Scripia Materialia 64, 2011, pp. 9-12.

* cited by examiner

FRICTION STIR WELDING TOOL AND PROCESS FOR WELDING DISSIMILAR MATERIALS

CROSS REFERENCE TO RELATED APPLICATION

This application claims priority from U.S. application Ser. No. 12/818,739 entitled "Friction Stir Welding Tool and Process for Welding Dissimilar Materials" filed 18 Jun. 2010 published as U.S. Publication No.: 2011-0309131 on 22 Dec. 2011, now abandoned, which application is incorporated herein in its entirety.

STATEMENT REGARDING RIGHTS TO INVENTION MADE UNDER FEDERALLY-SPONSORED RESEARCH AND DEVELOPMENT

This invention was made with Government support under Contract DE-AC05-76RLO1830 awarded by the U.S. Department of Energy. The Government has certain rights in the invention.

FIELD OF THE INVENTION

The present invention relates generally to friction stir welding tools and processes. More particularly, the invention is a friction stir welding tool and process for lap welding dissimilar materials together.

BACKGROUND OF THE INVENTION

Friction stir welding (FSW) is a process for joining metals without fusion or filler materials. FSW is used routinely for joining components made of aluminum and its various alloys. Indeed, it has been convincingly demonstrated that the process results in strong and ductile joints, sometimes in systems which have proved difficult using conventional welding techniques. The process is most suitable for components which are flat and long (plates and sheets) but can be adapted for pipes, hollow sections and positional welding. The welds are created by the combined action of frictional heating and mechanical deformation due to a rotating tool. However, joining dissimilar materials with significantly different properties (e.g., melting temperatures and densities) is problematic for most welding methods, because the lower temperature melting material can liquefy and be removed from the desired bonding area before the higher melting temperature material melts and before the weld can form. In general, conventional FSW between dissimilar materials yields unstable lap weld joints due to the vastly different melt temperatures and flow stress properties of the materials. Wide statistical deviation in the resulting lap welds is a common result.

The present invention disclosed herein provides for lap welding between dissimilar materials. Additional advantages and novel features of the present invention will be set forth as follows and will be readily apparent from the descriptions and demonstrations set forth herein. Accordingly, the following descriptions of the present invention should be seen as illustrative of the invention and not as limiting in any way.

SUMMARY OF THE INVENTION

The invention is a friction stir welding tool and process for lap welding dissimilar materials together. The tool includes a scribe cutter that is integrated with, and radially positioned off center from, a pin component of the tool. The scribe cutter extends a preselected distance from the surface of the pin component. The scribe cutter is configured to plunge through a first material positioned atop a second material in a lap weld configuration to a preselected depth that cuts a preselected portion of the second material, which provides a geometry that includes a plurality of mechanically interlocking features in the surface of the second material component. The first material extruded by the tool backfills the mechanically interlocking features that generates a lap weld across the length of the interface between the first and second materials with enhanced shear strength. Shear strengths of the lap weld joints can be in excess of 90% of the strength of the weaker material in the lab weld stack. In one embodiment, the scribe cutter includes tungsten carbide. In various embodiments, the scribe cutter includes a component selected from, but not limited to, e.g., nickel, titanium, tungsten, steel, carbide steel, polycrystalline cubic boron nitride, silicon nitride, rhenium, boron, and combinations of these materials. The scribe cutter extends a distance from the surface preferably in the range from about 0.1 mm to about 1.0 mm, but is not limited. The scribe cutter includes a radial offset distance that is at least about one quarter of the diameter of the base of the pin component. The scribe cutter is coupled to the pin component that can include a taper angle greater than or equal to about 90 degrees. The pin component may include scroll threads or other features positioned along the length of the pin component that rotate in a clockwise or counter clockwise direction to drive first material extruded by the scribe cutter in the lap weld stack to the center line of the lap weld for incorporation therein. The scribe cutter provides a rotational velocity of preferably between about 100 rpm and 1000 rpm, but is not limited. The scribe cutter provides a plunge depth in the second material that is less than or equal to the length of the scribe cutter. The scribe cutter generates a weld interface with a width that is at least about two times the radial offset distance of the scribe cutter. Other radial offset distances can be selected in other embodiments. The scribe cutter contacts the first (or top) material as it plunges through the lap weld stack and cuts the surface of the second (or lower) material in the lap weld stack between the two materials forming mechanical interlocking features. The invention tool further includes a shoulder portion that surrounds the pin component at the base. The shoulder portion includes a surface that may be concave or convex. The shoulder portion may further have a smooth surface or a featured surface that includes scroll grooves defined by concentric spacings that deliver the first material extruded by the scribe cutter. The shoulder portion is positioned near the base of the pin component in relation to the plunge direction. The scribe cutter backfills the mechanical interlocking features in the second material forming the lap weld joint. The scribe cutter extrudes the first (or top) material in the lap weld stack at below its melting temperature such that the first material maintains a shear stress characteristic of the solid state, but that allows it to fill the mechanically interlocking features introduced into the surface of the second material forming the lap weld. The scribe cutter extrudes the first material such that the first material fills the mechanical interlocking features at a substantially uniform hydrostatic pressure. The pressure selected is a function of the material type and shape of the friction stir tool. The scribe cutter maintains an operating temperature for the second material that is below the melting temperature of the first material. The scribe cutter is angled with respect to the vertical direction at an angle between 0 degrees (i.e., that is aligned in the tool plunge direction or the vertical direction) and 90 degrees (i.e., that is aligned at right angles to the plunge direction, or the horizontal direction). The cutting scribe can produce lap welds between dissimilar materials with increased shear strength and a lower statistical deviation compared to lap welds produced absent the cutting scribe. The cutting scribe yields lap welds with mechanical interlocking features that enhance the shear strengths of the welds. Shear strengths between the selected dissimilar materials are a function of the types of materials used, melting points, densities, and hardness characteristics of the selected materials. The scribe cutter of the lap weld tool provides a cutting depth in the second material that is less than or equal to the length of the scribe cutter. In one embodiment, the scribe cutter cuts a preselected portion from the second material that defines a weld interface with a center line for forming the lap weld. The weld interface includes a width defined by the radial offset dimension of the scribe cutter. The radial offset distance of the scribe cutter can be varied. In a preferred embodiment, radial offset distance is at least about $1/4^{th}$ of the pin tip diameter off. In one embodiment, the diameter of the scribe cutter is about 0.031 inches (0.79 mm), but is not limited. The scribe cutter extends a preselected distance from the surface of the pin component. In one embodiment, the scribe cutter extends to a height of about 0.070 inches from the surface (face) of the pin component. The scribe cutter can further include a positioning angle relative to the vertical direction of less than about 90 degrees. In various embodiments, dissimilar materials in the lap weld stack can include: aluminum, magnesium, titanium, or alloys thereof; steel or steel alloys; ceramics; polymers; and combinations of these materials, described herein. The first dissimilar material and the second dissimilar material have a melting temperature that is preferably different from the other by at least about 20%. Alternatively, the first dissimilar material and the second dissimilar material have a density that is preferably different from the other by at least about 10%.

The purpose of the foregoing abstract is to enable the United States Patent and Trademark Office and the public generally, especially scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Various advantages and novel features of the present invention are described herein and will become further readily apparent to those skilled in this art from the following detailed description. In the preceding and following descriptions the preferred embodiment of the invention is shown and described by way of illustration of the best mode contemplated for carrying out the invention. As will be realized, the invention is capable of modification in various respects without departing from the invention. Accordingly, drawings and descriptions of the preferred embodiment set forth hereafter are to be regarded as illustrative in nature, and not as restrictive.

A more complete appreciation of the invention will be readily obtained by reference to the following description of the accompanying drawings in which like numerals in different figures represent the same structures or elements.

DETAILED DESCRIPTION OF THE INVENTION

Figure 1:
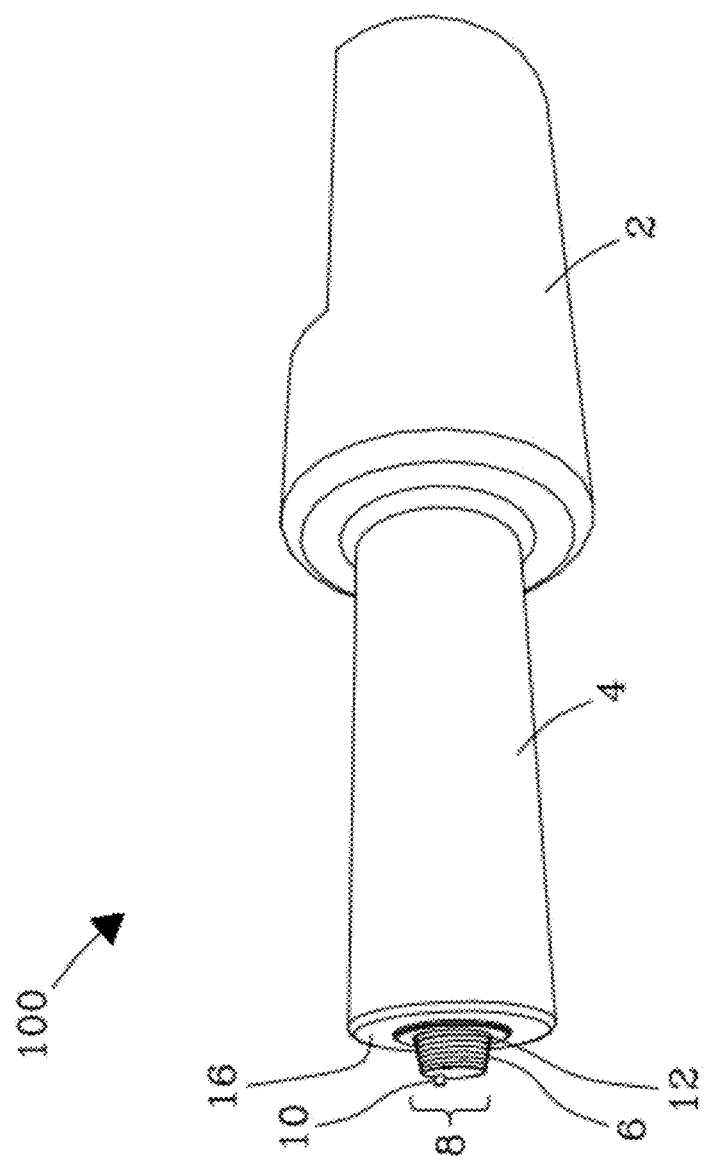
FIG. 1 shows a perspective side view of one embodiment of the invention.

The invention is a lap weld forming tool and process of a friction stir weld (FSW) design that generates lap welds between dissimilar materials with enhanced joint strengths. As used herein, the term "dissimilar" in reference to lap weld component materials being joined means: "a difference in melting (temperature) point of more than about 20%, or a difference in density of at least about 10% by mass. The lap weld forming tool and process of the present invention overcome the chemical incompatibility between dissimilar materials and components generating a lap weld that binds the dissimilar materials (e.g., Mg to steel) together. The chemical incompatibility is overcome in two distinct ways. First, the lap weld produced by the invention chemically bonds the material components together using sufficient hydrostatic pressure and heat. Secondly, the lap weld forming tool includes a scribe cutter detailed further herein that introduces features into the surface of the second material (i.e., the component having the higher melting temperature or higher density) (e.g., steel), which is placed generally at the bottom of the lap weld stack along the length of the weld interface. The term "lap weld stack" as used herein in reference to materials being joined refers to the arrangement in which at least a first material is stacked atop at least a second material. A region of overlap is established between the dissimilar materials as a weld interface between the components being joined together. The mechanical interlocking features introduced into the surface of the second material component are back-filled with the first material that is extruded by the scribe cutter and delivered by the lap weld forming tool. The filled interlocking features enhance the shear strength of the lap welds formed. As such, the invention provides lap weld joints between dissimilar materials that appear to be bonded both chemically and mechanically. Lap welds of the invention thus exhibit less susceptibility to variations in sheet thickness and surface conditions of the selected dissimilar materials.

The lap weld forming tool of the invention will be described herein in reference to formation of lap welds between two dissimilar materials, magnesium (Mg) as a first material component, and steel and steel alloys as a second material component. While tests will be described in conjunction with these exemplary materials, it is to be strictly understood that the invention is not limited thereto. No limitations are intended.

The following description includes the preferred best mode of one embodiment of the present invention. Basics for construction and operation of the invention are also detailed hereafter. It will be clear from this description of the invention that the invention is not limited to these illustrated embodiments but that the invention also includes a variety of modifications and embodiments thereto. Therefore the present description should be seen as illustrative and not limiting. While the invention is susceptible of various modifications and alternative constructions, it should be understood that there is no intention to limit the invention to the specific form disclosed, but, on the contrary, the invention covers all modifications, alternative constructions, and equivalents falling within the spirit and scope of the invention as defined in the claims.

FIG. 1 shows a lap weld forming tool 100 of a friction stir weld (FSW) design for joining dissimilar metal components, according to an embodiment of the invention. Lap weld tool 100 includes a body 2. In the figure, a shank 4 couples centrally (i.e., in the middle of) to body 2, but is not limited thereto. Tool 100 includes a pin component 6 of a tapered and threaded design that couples centrally on face 5 of shank 4 that surrounds pin 6 at the base of pin 6. A scribe cutter 10 of a preselected, non-limiting length is integrated on face 8 of pin 6. Scribe cutter 10 is positioned a preselected distance radially off center on the face 8 of pin 6. In the exemplary embodiment, scribe cutter 10 is composed of tool grade tungsten carbide. Tool body 2, shank 4, and pin 6 are constructed of hardened H-13 tool steel, but component materials are not limited thereto. As will be understood by the person or ordinary skill in the art, tool 100 may be of a unibody construction or otherwise constructed of a single tool material. Thus, no material limitations are hereby intended. In the exemplary embodiment, scribe cutter 10 is of a cylindrical design, but shape of scribe cutter 10 is not limited to cylindrical shapes, as described further herein. Scribe cutter 10 includes sharpened leading edges (not shown) that penetrate and cut through, materials (e.g., metals, ceramics, polymers, and other selected materials described herein) being joined in a lap weld 25. Scribe cutter 10 penetrates through the first material 22 positioned atop second material 24 of the lap weld stack 25 and extrudes first material 22 to a preselected depth. Scribe cutter 10 then cuts a surface of the second material 24 in the stack 25 to form a geometry that includes a plurality of mechanically interlocking features (described further in reference to FIG. 7b). Scroll grooves 14 of pin component 6 and scroll grooves 20 of shoulder 16 move first (or top) material 22 extruded by scribe cutter 10 and backfills the extruded material into the mechanically interlocking features along the length of the interface 28 between the first 22 and second materials 24 that yields the lap weld 28 between the dissimilar materials (22, 24). The presence of the mechanically interlocking features enhances the shear strength of the lap weld 28, as described further herein. The off center radial position of scribe cutter 10 on face 8 of pin 6 determines the width of or length across lap weld 28 formed between the selected material components (22, 24). In the exemplary embodiment, scribe 10 includes a height measured from the surface 8 of pin component 6 of between about 0.1 mm and about 0.5 mm, but is not intended to be limited thereto. For example, scribe 10 can include a height defined as a percentage of the length of pin component 6 from about 1% to about 25% of the length of the pin. Thus, no limitations are intended to dimensions of the exemplary embodiment. In a preferred embodiment, lap weld forming tool 100 is of a convex scroll design described further herein in reference to FIG. 4. In exemplary lap weld tests, lap weld tool 100 of the invention was tested by joining dissimilar metal materials together. In exemplary tests, magnesium (Mg) metal was joined as a first material sheet component 22 together with various steel alloys as a second material component 24, described hereafter.

Lap Weld Forming Materials

Various combinations of dissimilar materials can be joined via lap weld in conjunction with the invention. Suitable materials include a difference in melting temperature of at least about 20%, a difference in density of at least about 10%, and differences of at least about 10% in hardness and viscosity. Materials include, but are not limited to, e.g., metals and metallic materials, polymers and polymeric materials, ceramics and ceramic materials, as well as combinations of these materials. Material combinations include, but are not limited to, e.g., metal-metal combinations, polymer-polymer combinations, metal-polymer combinations, metal-ceramic combinations, polymer-ceramic combinations, and like material combinations. All dissimilar materials as will be selected by those of ordinary skill in the art in view of the disclosure are within the scope of the invention.

Figure 2:
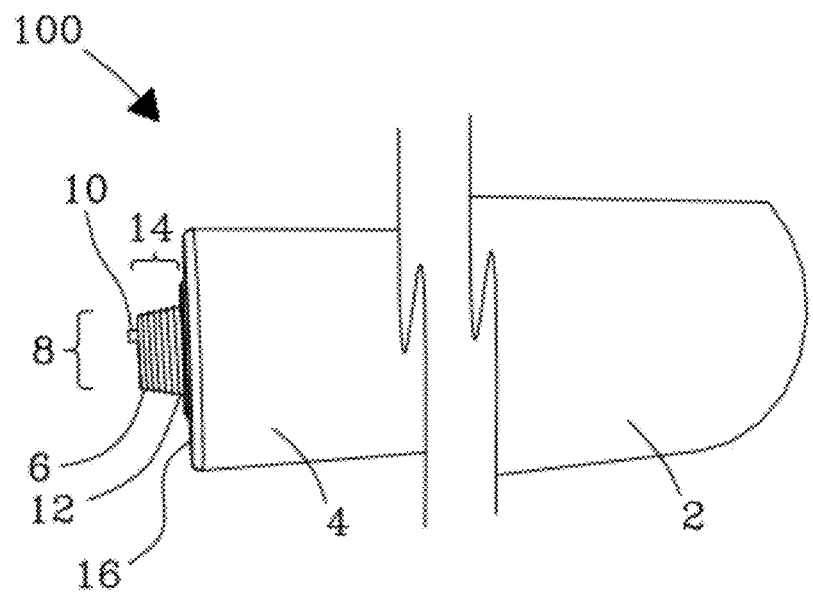
FIG. 2 shows an enlarged side view of one embodiment of the invention.

FIG. 2 shows an enlarged side view of lap weld tool 100. In the figure, scribe cutter 10 is positioned radially off-center on face 9 of pin 6. Pin 6 is of a tapered and threaded design that couples centrally to shank 4, defining a shoulder 16 that surrounds pin 6 at the base 12 of pin 6. Shank 4 couples centrally to body 2. Pin 6 and shoulder 16 include a series of scroll grooves 14 (e.g., ~5 turns and 2.5 turns, respectively) that in the exemplary embodiment turn in a direction that drives material 22 extruded by scribe cutter 10 to the centerline (i.e., placed at the center of) along interface 28 when tool 100 is rotated at a preselected rate or velocity, described further in reference to FIG. 4. In the exemplary embodiment, shoulder 16 has a preferred, non-limiting diameter of about 12.5 mm. The material 22 extruded by scribe cutter 10 is placed into the mechanical interlocking features (described further in reference to FIG. 7b) introduced by scribe cutter 10 into second material 24 as scribe cutter 10 moves along the length of interface 28 between dissimilar materials (22, 24) being joined. This mechanical interlocking geometry along the interface 28 between the dissimilar materials (22, 24) enhances the shear strength of lap weld 28 that forms.

Figure 3:
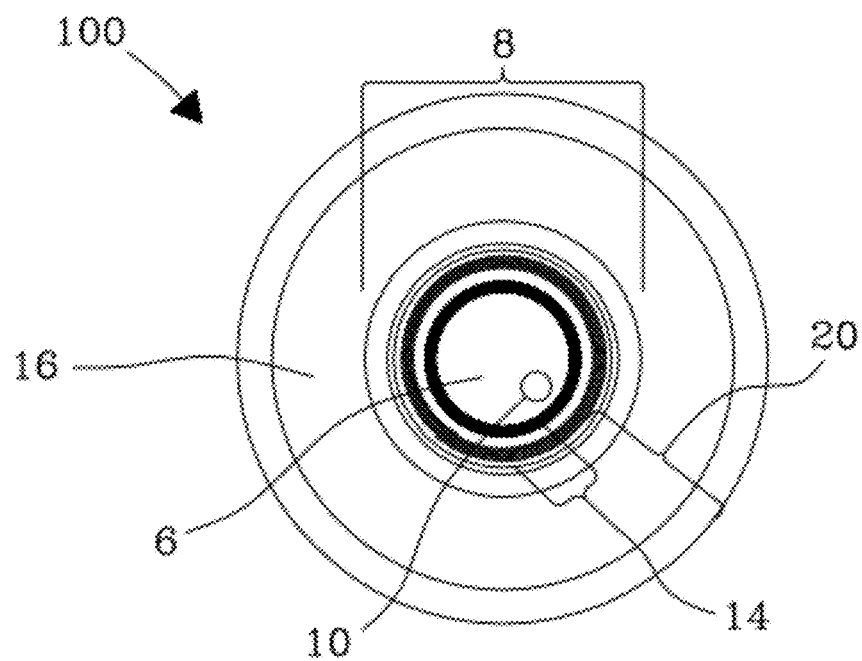
FIG. 3 is a front face view of a preferred embodiment of the invention.

FIG. 3 shows a front view of face 8 of lap weld forming tool 100 of the invention. In the figure, tool 100 includes a pin component 6 that includes a series of scroll grooves 14 that in the current configuration turn in a counter-clockwise (CCW) direction at a preselected rate, described further in reference to FIG. 4. Tool 100 further includes a shoulder 16 configured with a series (e.g., 2.5 turns) of scroll grooves 20 that also turns in a counter-clockwise direction when tool 100 is rotated at a preselected rate. Number of grooves and turns is not limited. Turn direction is also not limited. In the figure, scribe cutter 10 is shown as an integrated component positioned radially off-center on face 8 of pin 6. Scribe cutter 10 includes leading sharp cutting edges (not shown) that provide the cutting, penetrating, and plunging into various materials and components required to form the lap welds between dissimilar materials. Shape of scribe cutter 10 and its cutting edges are not limited, as described further herein.

Figure 4:
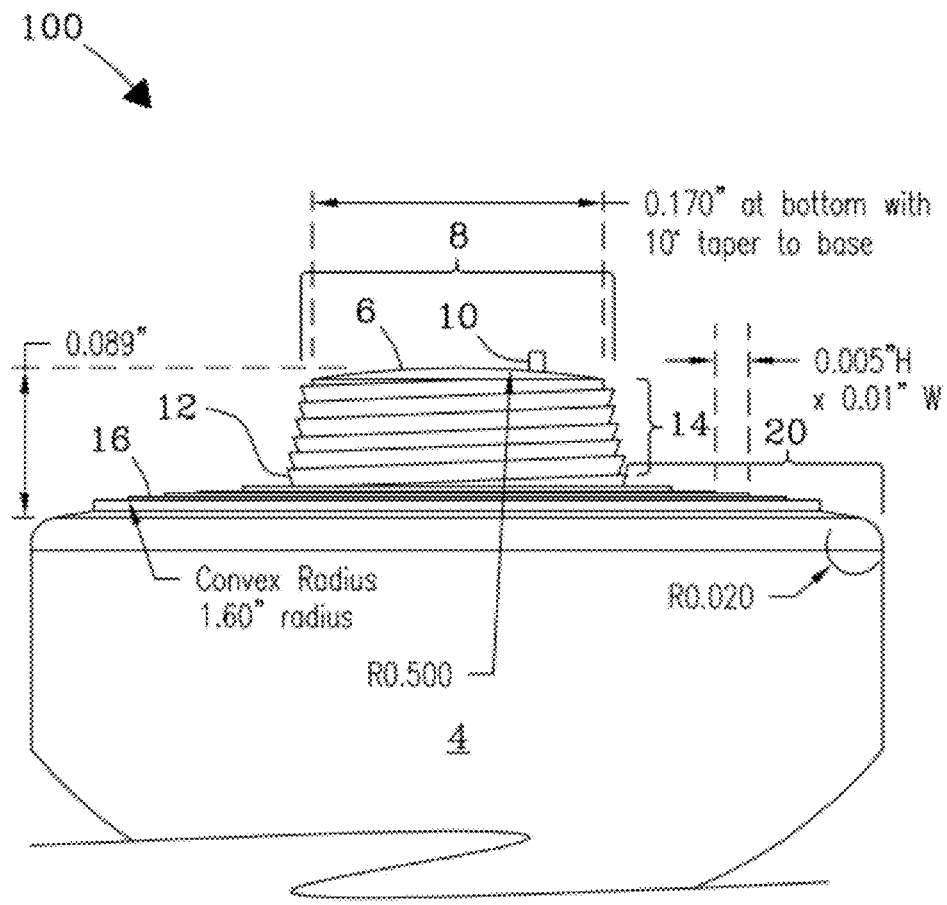
FIG. 4 is an enlarged side view of one embodiment of the invention.

FIG. 4 shows an enlarged profile view of an exemplary embodiment of lap weld forming tool 100, including radial and structural dimensions. In the figure, tool 100 includes a pin component 6 that couples to shank component 4 forming a shoulder 16. Shoulder 16 is of a convex tapered design that includes threaded scrolls 20 that drive material 22 extruded by scribe cutter 10 to the centerline of the lap weld interface (described further in reference to FIG. 6a). In the exemplary embodiment, pin component 6 includes a diameter across face 9 of about 0.17 inches (0.4 mm), but is not limited thereto. In one embodiment, scribe cutter 10 is integrated on the face 9 of pin 6 and extends from the surface a preselected height of 0.10 inches (0.254 mm). In another embodiment, scribe cutter 10 extends from the surface to a height of about 0.25 mm from the surface and has a width (diameter) of about 0.8 mm. In the exemplary embodiment, radial distance of scribe cutter 10 on face 8 of pin 6 is preselected between about 1.0 mm and 1.8 mm from the center of pin 6 on face 8. As will be understood by the person or ordinary skill in the art, distance that scribe cutter 10 extends from the surface of pin 6 can be varied so as to provide a variety of penetration (plunge) depths through various lap weld stacks 25 assembled with dissimilar materials of various thicknesses. Thus, thickness of materials is not intended to be limiting. Thicknesses of component materials can be selected in the range from about 0.5 mm to about 50.0 mm. Thus, no limitations are intended. In the exemplary embodiment, tool 100 employs magnesium and steel component materials. Preferred thickness is between about 2.1 mm and about 2.5 mm, but is not limited thereto. In the exemplary embodiment, pin 6 also includes a 10° taper angle, but angle is not limited thereto. The taper incline increases from the top of face 9 down the length of pin 6 to its base 12, where pin component 6 couples to the shank component 4 forming shoulder portion 16. Pin component 6 includes scrolls (threads) 14 (e.g., 2 starts, ~3.25 turns) that in operation rotate in a counter clockwise (CCW) direction. Direction is not limited. Shoulder 16 of the exemplary embodiment also includes a series of scrolls 20 (e.g., 2 starts, ~2.5 turns). In the figure, each scroll 20 of shoulder 16 has an exemplary thread dimension that is 0.005 inches high and 0.01 inches wide, but dimensions are not intended to be limited thereto. The diameter of shoulder scrolls 20 increases progressively from the interior edge of the shoulder 16 diameter to the outermost edge of the shoulder 16 diameter. Scrolls (14, 20) of the exemplary embodiment turn in a counterclockwise direction when pin 6, shoulder 16, (and scribe cutter 10 of tool 100 rotate. In operation, pin component 6 of tool 100 turns (rotates) at a preselected rate preferably in the range from about 100 rpm to about 1000 rpm, but rate is not a limiting parameter. Shoulder 16 of the exemplary embodiment further includes a raised convex surface (~1.60" radius) 18 that assists movement of extruded material that fills mechanical interlocking features (described further in reference to FIG. 7b) formed in second material 24 by scribe cutter 10. The mechanical interlocking features ultimately enhance the strength of the lap weld (described in reference to FIG. 5a) in lap weld stack 25 between the dissimilar materials (22, 24).

Figure 5A:
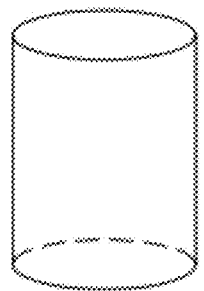
FIGS. 5a-5f illustrate various geometries for the scribe cutter, according to various embodiments of the invention.
Figure 5B:
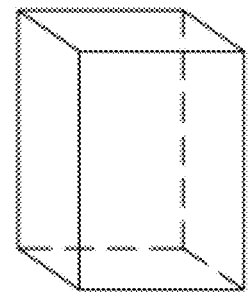
Figure 5C:
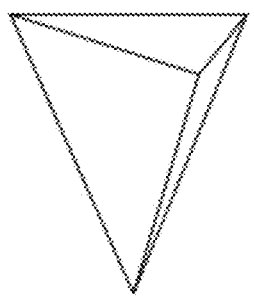
Figure 5D:
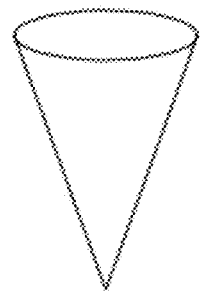
Figure 5E:
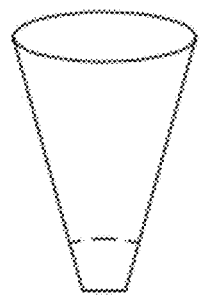
Figure 5F:
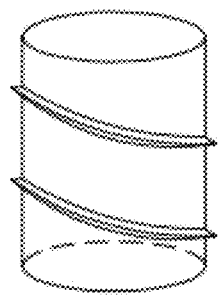

FIGS. 5a-5f show various alternate geometries for scribe cutter 10. In FIG. 5a, scribe cutter 10 is of a substantially cylindrical design, as described previously herein in reference to the exemplary embodiment, but shapes are not limited thereto. For example, in other embodiments, shape of scribe cutter 10 includes, but is not limited to, e.g., rectangular (FIG. 5b), triangular and pyramidal (FIG. 5c), and conical (FIG. 5d). In yet other embodiments, scribe cutter 10 is of a structured design that includes, but is not limited to, e.g., tapered design (FIG. 5e), a threaded design (FIG. 5f), and other non-cylindrical geometries, including combinations of these various designs. No limitations are intended.

Plunge Features

Figure 6A:
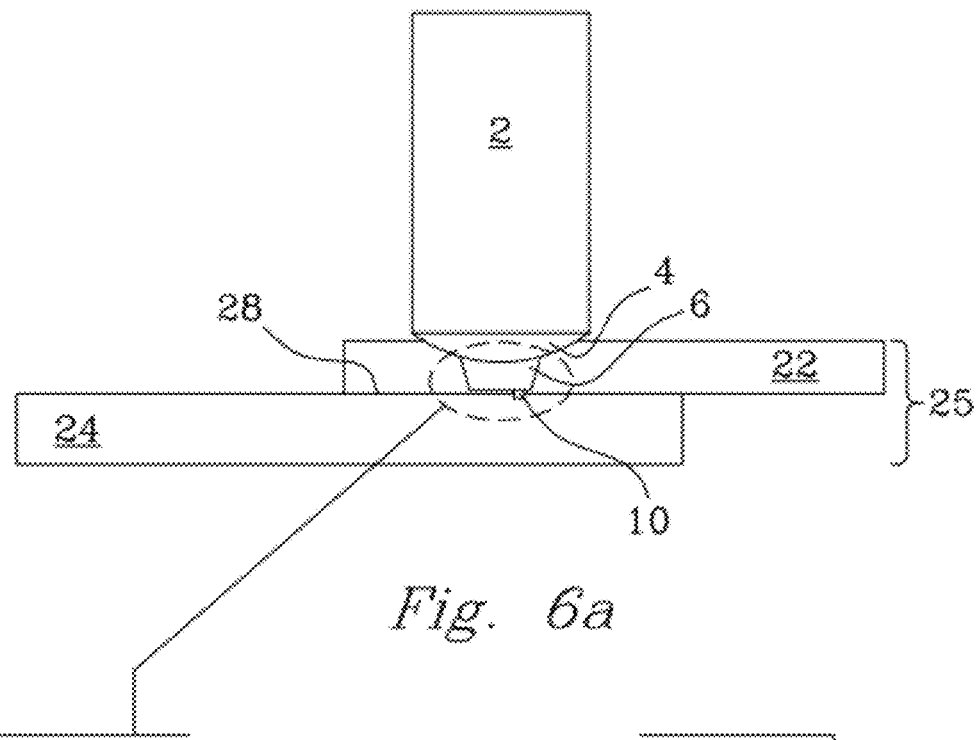
FIGS. 6a-6b illustrate plunge features of the scribe cutter of the invention for forming lap welds between dissimilar metal components, according to a preferred embodiment of the invention.
Figure 6B:
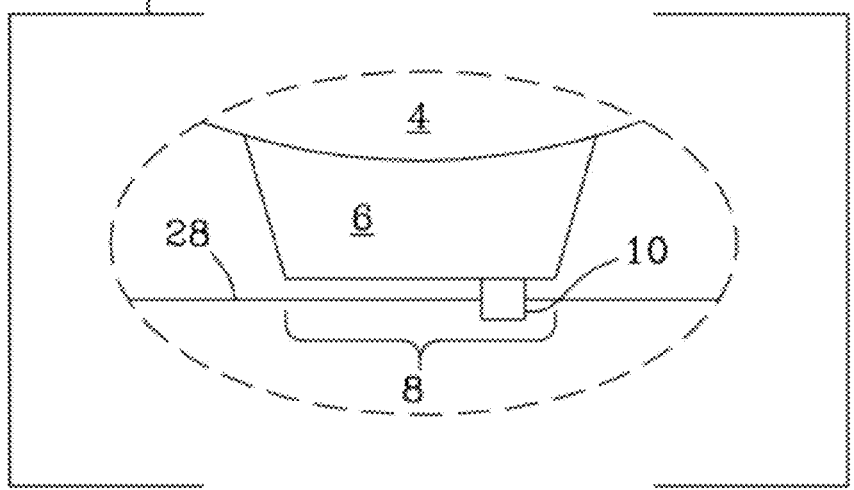

FIGS. 6a-6b illustrate the unique plunge features provided by the scribe cutter 10 of lap weld tool 100 of the invention for forming lap welds between dissimilar materials, according to a preferred embodiment of the invention. The length of scribe cutter 10 of lap weld forming tool 100 allows the preselection of various plunge depths, given that the pin 6 and shoulder 16 components of tool 100 preferably do not contact the second (bottom) material 24 in lap weld stack 25 during formation of the lap weld—a unique property of the invention. In the lap weld forming process, lap weld forming tool 100 with its attached or integrated scribe cutter 10 penetrates through the first (top) material 22 (e.g., Mg) of lap weld stack 25 and plunges to a preselected depth that contacts and cuts the surface of second material 24 (e.g., steel), but avoids contact with the pin component 6 or shoulder 16. This configuration ensures tool 100 will produce insufficient heat to melt the first, or lower melting, material component 22, yet allows scribe cutter 10 to penetrate through, extrude, and mix the first material component 22. The preselected plunge depth reached by scribe cutter 10 through lap weld stack 25 provides contact with, and cuts a beneficial geometry on, a preselected portion of the surface of second material 24. This is a fundamentally different approach than is undertaken with FSW tools and processes known in the prior art. In particular, scribe cutter 10 of the present invention introduces a geometry that forms mechanical interlocking features (FIG. 8a) into the surface of second material 24 between dissimilar materials (22, 24) along the length of the interface 28 that defines lap weld 28. These mechanical interlocking features are backfilled with first material 22 that is extruded by scribe cutter 10 as it plunges and moves through the lap weld stack 25 into second material component 24 along weld interface 28. Position of scribe cutter 10 on the pin component 6 allows the width or area across the interface 28 to be varied or preselected without increasing the size of tool 100. Lap weld forming tool 100 of the invention further minimizes heat required to form lap weld 28, which minimizes deleterious effects associated with excessive heat. Presence of mechanical interlocking features (FIG. 8b) further enhances the shear strength of lap weld 28, while simultaneously minimizing statistical deviation in joint strengths associated with formation of the lap weld, and providing reproducible lap welds in accordance with the invention as described further herein. Mechanical interlocking is made possible by differences in the melting temperatures, densities, and other associated properties between the dissimilar materials (22, 24) selected. Such differences and extremes in material properties are not experienced by prior art FSW devices and processes because the materials to be joined are largely similar properties. Thus, the invention provides a lap weld (joint) 28 between selected dissimilar materials (22, 24) that is appears to be both chemically bonded and mechanically bonded. Pressures required by the present invention to penetrate component materials (22, 24) in lap weld stack 25 are not intended to be limited. For example, pressures will depend on the materials being joined, the hardness of selected materials, the thickness of materials being joined, the rate of rotation of the scribe cutter 10, and other welding parameters including, but not limited to, e.g., plunge velocity, tool shape, plunge depth, and tool materials. Thus, no limitations are intended. The process for joining dissimilar materials in conjunction with the invention will now be described.

Solid State Joining of Dissimilar Materials

Figure 7:
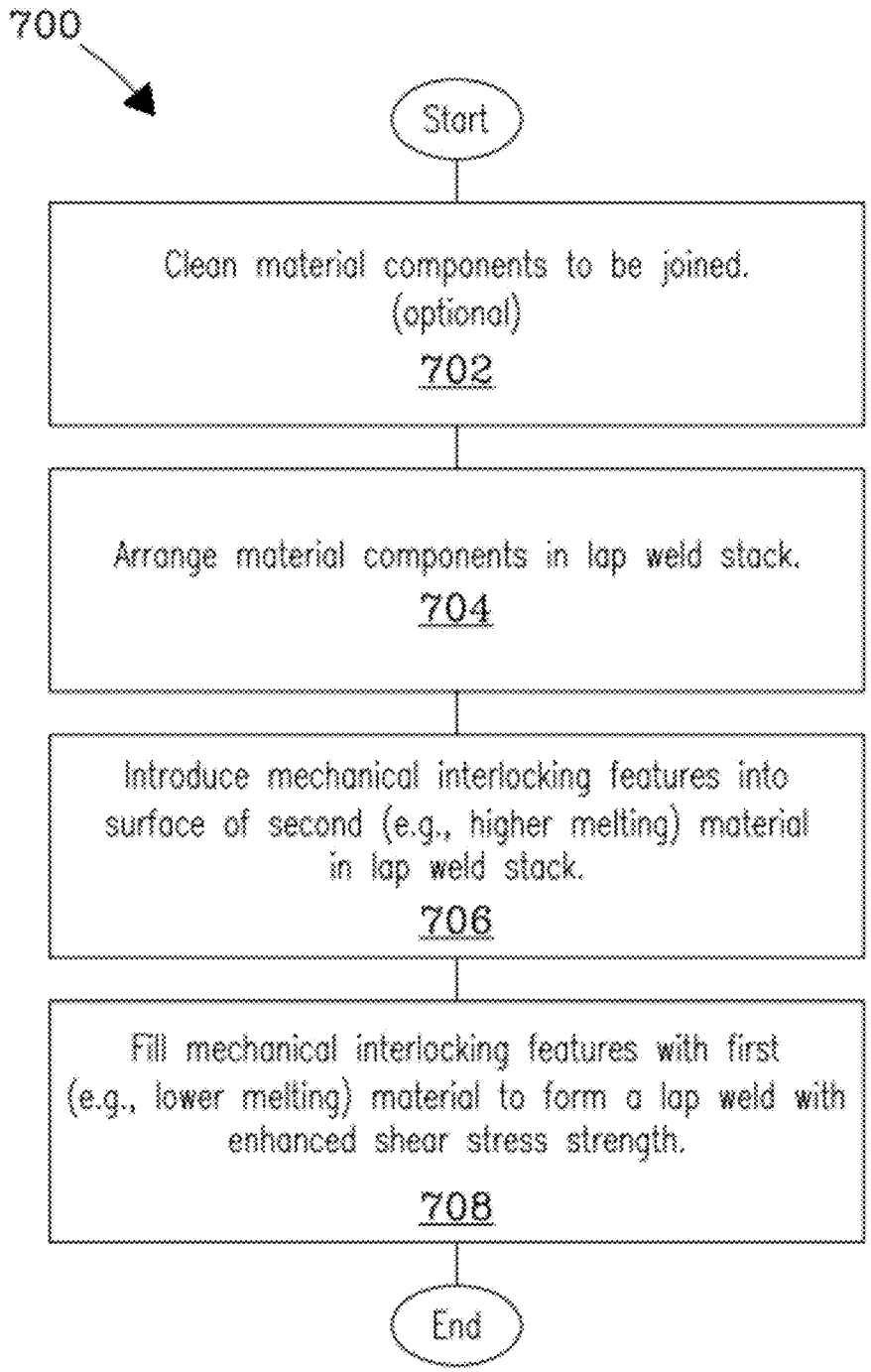
FIG. 7 shows a typical process for forming a lap weld, according to an embodiment of the process of the invention.

FIG. 7 shows a typical process 700 for joining dissimilar materials in accordance with the invention. {START}. In an optional first step {Step 702}, materials to be joined are cleaned, e.g., using isopropyl alcohol or another cleaning solution prior to welding. Next {Step 704}, materials to be lap welded are arranged in a suitable lap weld stack 25 or configuration. For the exemplary lap weld described herein, a sheet of magnesium (Mg) 22 of a preselected thickness (e.g., 2.3-mm to 2.5-mm) was placed atop a sheet of steel 24 of a similar thickness. Thicknesses of the dissimilar materials are not limited. Overlap width of first (top) component material 22 and second (bottom) component material 24 in the exemplary lap weld stack 25 that defined lap weld interface 28 were typically about 35-mm, but is not limited thereto. Next {Step 706}, lap weld forming tool 100 is positioned over the lap weld interface 28 (centerline) of the overlapping material components (22, 24) and scribe cutter 10 cuts second (bottom) material 24, introducing mechanically interlocking features (FIG. 8b) of a preselected depth into the surface of second material 24. Typical cut depth in surface of component 24 is about 0.05", but is not limited. For example, tool 100 can be plunged to a limit of about 95% of the thickness of the first (top) sheet 22 or up to the length of scribe cutter 10 such that the scribe 10 interfaces with second material 24 without generating excessive heat that can melt the lower melting material 22. Scribe cutter 10 has an exemplary length of about 0.010", but is not limited thereto. Thus, in the exemplary embodiment, plunge depth through material components (22, 24) of lap weld stack 25 is preselected in the range between about 0.003" and about 0.007" depending on the thickness of the second material 24, but is not limited thereto. Following penetration into lap weld stack 25, lap weld forming tool 100 proceeds, e.g., in the X-dimension, placing material 22 extruded by scribe cutter 10 along the centerline of weld interface 28 as tool 100 rotates and scrolls (e.g., in the counter-clockwise direction). A sufficient pressure and heat (that are functions of both tool geometry and process parameters) are selected to extrude material from the first material component 22 that serves to move this material into the interlocking features (FIG. 8b) introduced into second material 24 along the interface 28 between dissimilar materials (22, 24). The invention further enables the FSW process in that no melting of top sheet 22 occurs between dissimilar materials (22, 24). Lap weld forming tool 100 in combination with scribe cutter 10 generates sufficient forging loads and thermal heat to reduce yield and flow stresses of first (top) material 22 without melting it. Next {Step 708}, scribe cutter 10 backfills the mechanical interlocking features (FIG. 8b) introduced into the surface of second material 24 with the first material 22 extruded by scribe cutter 10, which enhances the shear strength of the lap weld 28 formed between dissimilar metal components (22, 24) along the length of interface 28 {END}.

Microstructure of the Lap Weld

Figure 8A:
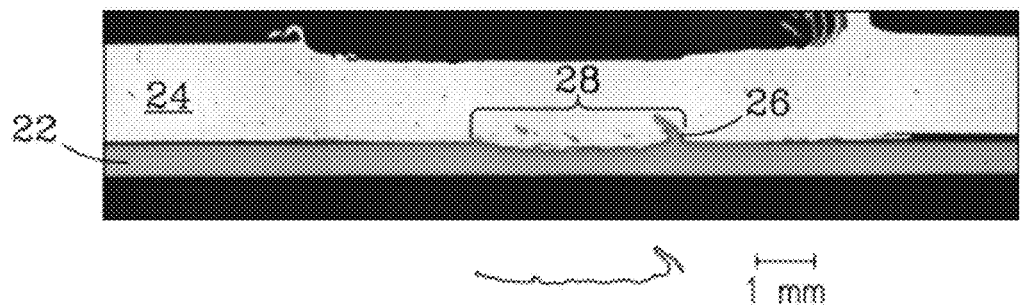
FIG. 8a-8b compare lap welds produced by the invention and a prior art process.
Figure 8B:
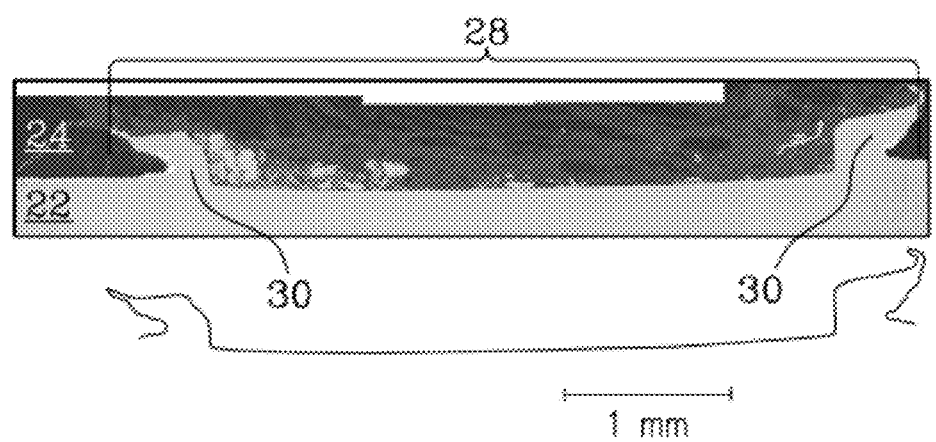

FIGS. 8a-8b are cross-sectional views of lap weld joints produced by a conventional Friction Stir Weld (FSW) process (FIG. 8a) and the invention (FIG. 8b), respectively, that compare the microstructure of the welds. In FIG. 8a, the conventional FSW lap weld joint 28 shows a small void 26. The convention joint exhibits a low shear stress tolerance. In FIG. 8b, in contrast, lap weld joint 28 of the invention includes mechanical interlocking features 30 along the length of the lap weld interface 28. These mechanical interlocking features 30 are introduced into the surface of second material 24, as scribe cutter (FIG. 4) of lap weld forming tool 100 advances horizontally from right to left into the photograph plane. The mechanical interlocking features 30 are backfilled with first material 22 (e.g., Mg) extruded by scribe cutter (FIG. 4) as it advances along the length of the lap weld interface 28 through lap weld stack 25. The mechanical interlocking features 30 provide one binding mechanism that secures the dissimilar materials (22, 24) in lap weld 28 together, which serves to enhance the shear strength of the lap weld 28. In exemplary lap welds of the invention produced between dissimilar materials composed of magnesium and various steels and steel alloys, the lap welds 28 exhibited shear stress yields greater than about 90% of the strength of the individual materials (22, 24) forming the lap weld 28. Typical load stresses and temperatures employed by the invention depend on the tool design, rotation, transverse translation speeds, applied pressure, as well as the material properties between the dissimilar materials being joined. The central plunge region that produces lap weld 28 contains a characteristic "onion-ring" flow pattern, which is the most severely deformed region of lap weld 28. The layered onion-ring structure is a consequence of the way in which scroll grooves (14, 20) of the tool 100 deposit material 22 extruded by scribe cutter 10 from the front to the back of the weld 28 as the cutter 10 rotates in the interface 28 between the materials (22, 24) being joined. Designs of the lap weld forming tool 100 of the present invention concentrate on the ratio between the pin 6 and the shoulder 16; preferred diameters are in a ratio of about 1:3. Rotational aspects of scribe cutter 10, scrolls (14, 20), pin component 6, and shoulder 16 are designed to influence the overall flow of first (top) material 22 into the mechanical interlocking features (FIG. 8b). For example, when joining materials with greatly differing flow stresses and melting regimes, the invention tool 100 does not mix the two materials. Conventional understanding of linear friction stir welding of lap joints prior to the invention was that a FSW tool should penetrate (plunge) entirely through the material of upper sheet 22. However, experiments with conventional linear friction stir welding devices demonstrated that plunging a FSW tool into the lower sheet 24 of a lap weld stack 25 configured with materials with melting points that differed by at least 20% quickly generates temperatures that melt the first (top and less dense) material, forming unstable lap weld joints with insufficient load and shear stress strengths. Tests have demonstrated, for example, that contact between a pin component and a high temperature melting material (e.g., steel) produces excessive heat that proves to be problematic to the formation of a proper lap weld joint between dissimilar materials (22, 24). For example, in the exemplary embodiment described herein, attempts to join a Mg sheet 22 (a relatively low melting temperature metal) to steel sheets 24 and other steel alloys (significantly higher melting temperature metals) using a conventional FSW tool caused excessive flash, problematic microstructures, and other related bonding problems. In the present invention, introduction of scribe cutter 10 of lap weld forming tool 100 described herein prevents overheating of the lower melting temperature material 22. Scribe cutter 10 provides an effective geometry and area of contact on the high melting temperature metal component 24 for bonding the dissimilar materials (22, 24) together. Further, temperatures are selected such that they do not exceed 80% of the melting point of the lower melting metal component material 22. In addition, external pressures used for the lap welding process are generally not critical. Selected pressures are a function of the tool design, materials being lap welded, and plunge depths employed.

The exemplary embodiment of the invention was tested by measuring shear stress strength of lap welds between sheets of magnesium and steel alloys. The lap weld forming tool 100 integrates a small scribe cutter (i.e., an integral scribe) at the bottom of a pin component of a friction stir weld tool that includes a hardened or abrasive surface. In operation, the integral scribe cutter 10 of tool 100 produces a very small area of penetration through the first material 22 through lap weld stack 25 through the interface 28 defined between dissimilar materials (22, 24) and into second material 24. Only the scribe 10 of the invention contacts the surface of the $2^{nd}$ component material 24, thereby eliminating the excessive heat associated with conventional FSW tools and processes. The scribe cutter 10 then disrupts and cuts the surface of second material component 24 introducing mechanical interlocking features (FIG. 8b) into the second material component 24 that enhances the strength of the lap weld 28 formed between dissimilar materials (22, 24). A suitable temperature and pressure of the FSW stir weld turning process allows the softer material 22 component (e.g., Mg) in the dissimilar lap material stack 25 to fill the mechanical interlocking features (FIG. 8b) produced in the harder second material component 24.

The following examples will provide a further understanding of the invention in its larger aspects.

EXAMPLE 1

Statistical Deviation of Invention Lap Welds

A lap weld (250-mm line length) produced by the invention between a 2.3-mm thick sheet of a magnesium alloy (e.g., AZ31 alloy) and a 0.8-mm thick sheet of U.S. Steel Drawing Type B-Hot Dipped Galvanizing (DSTB-HDG) steel (http://www.uss.com/corp/auto/tech/grades/lowcarbon/ds_type_b.asp) gave a shear strength of 210.4 kN/m with a deviation of +/−5.06 (83% to 87% of the tensile strength for the 0.8 mm steel). A lap weld produced for identical materials using a conventional FSW tool without the scribe cutter demonstrated a shear strength of 188.4 kN/m with a deviation of +/−60.5 (37% to 84% of the tensile strength of the 0.8-mm steel). Results show an increase in the strength of the invention lap weld of at least about 25% on average compared to the conventional weld. Furthermore, statistical deviation of the lap weld shear strength was reduced from 60.5 kN/m to 5.06 kN/m.

EXAMPLE 2

Load Tolerance of Lap Weld #1

A lap weld made in conjunction with the invention between a 2.3-mm thick sheet of a magnesium alloy (e.g., AZ31) and a 0.8-mm thick sheet of U.S. Steel DSTB-HDG steel alloy demonstrated a load tolerance of ~6500N (245 kN/m). Normal load tolerances for AZ31 (2.3-mm) and DSTB-HDG (0.8-mm) are ~624 kN/m and ~247 kN/m, respectively. Results show the load capacity for invention lap welded materials to be at or near the bearing capacity of the weaker material (DTSB-HDG).

EXAMPLE 3

Load Tolerance of Lap Weld #2

Another lap weld made in conjunction with the invention combined a 2.3-mm thick sheet of magnesium alloy (e.g., AZ31) and a 1.5-mm thick sheet of High Strength, Low Alloy Hot Dipped Galvanizing (HSLA-HDG) steel. The lap weld demonstrated a maximum load of ~7600N (249 kN/m). Normal load tolerances for AZ31 (2.3-mm) and HSLA-HDG (1.5-mm) are ~624 kN/m and ~896 kN/m, respectively. Results show the load capacity for the invention lap welded materials to be at least about 40% of the bearing capacity of the AZ31, a significant increase (greater than 20%) over strengths of lap welds produced without the scribe cutter of the invention.

EXAMPLE 4

Load Tolerance of Lap Weld #3

Another lap weld made in conjunction with the invention combined a 2.3-mm thick sheet of magnesium alloy (e.g., AZ31) to a 0.8-mm thick sheet of DSTB-HDG steel. The lap weld demonstrated a maximum load of ~6200N (214 N/m). Normal load tolerances for AZ31 (2.3-mm) and DSTB-HDG (1.5-mm) are ~624 kN/m and ~247 kN/m, respectively.

CONCLUSIONS

A new lap weld forming tool and scribe cutter have been described that enable friction stir welding of dissimilar materials. The invention provides a wide variety of process parameters including, but not limited to, e.g., material melting temperatures, material density differences, material hardness properties, material thicknesses, greater control over heat inputs, tool rotation rates (RPM), linear weld velocity, and like process parameters. The invention scribe further provides the ability to tailor the microstructure of the materials in a lap weld stack that enhances the strength of the weld between the dissimilar materials. In particular, the invention adds a mechanical interlocking geometry into the weld interface that increases the strengths of the lap welds and minimizes the deviation and scatter therein. Exemplary lap welds have demonstrated shear strengths in excess of 90% of the base strength of the material components not previously known in the art.

While preferred embodiments of the present invention have been shown and described, it will be apparent to those of ordinary skill in the art that many changes and modifications may be made without departing from the invention in its true scope and broader aspects. The appended claims are therefore intended to cover all such changes and modifications as fall within the spirit and scope of the invention.

What is claimed is:

1. A method for forming a lap weld between at least two dissimilar materials, the method comprising the steps of:
   providing a friction stir welding tool comprising a shoulder, a pin extending from the shoulder, and a scribe cutter extending from the terminal end surface of the pin in an offset position wherein the terminal end surface is perpendicular to the longitudinal direction of the tool;
   stacking the dissimilar materials comprising a first material and a second material in a lap weld stack with an overlap therebetween defining a weld interface of a preselected width along the length between the materials being joined;
   penetrating through the first material of the lap weld stack to a preselected depth with the pin and the scribe cutter, the pin only penetrating into the first material and the scribe cutter penetrating through the first material and into the second material;
   wherein the scribe cutter cuts a surface of the second material to introduce a plurality of features therein along the length of the weld interface; and
   backfilling the features with extruded first material forming mechanically interlocking features along the length of the interface that yields a lap weld with an enhanced shear strength between the dissimilar materials.

2. The method of claim 1, wherein the first material is a metal selected from aluminum, magnesium, titanium, or alloys thereof.

3. The method of claim 1, wherein the second material is steel or a steel alloy.

4. The method of claim 1, wherein the first material is a ceramic and the second material is steel or a steel alloy.

5. The method of claim 1, wherein the first material and second material have a melting temperature that is different from the other by at least about 20%.

6. The method of claim 1, wherein the first material and second material have a density that is different from the other by at least about 10%.

7. The method of claim 1, wherein the cutting introduces cuts in the second material that are cross-sectional cuts.

8. The method of claim 1, wherein the penetrating includes extruding the first material at a temperature below its melting temperature.

9. The method of claim 1, wherein the lap weld has a shear strength that is at least about 80% of the strength of the lower melting material therein.

10. The method of claim 1, wherein the scribe cutter comprises tungsten carbide.

11. The method of claim 1, wherein the scribe cutter includes a member selected from the group consisting of: nickel, titanium, tungsten, steel, carbide steel, polycrystalline cubic boron nitride, silicon nitride, rhenium, boron, and combinations thereof.

12. The method of claim 1, wherein the scribe cutter extends a distance below the surface of the pin selected in the range from about 0.1 mm to about 1.0 mm.

13. The method of claim 1, wherein the scribe cutter includes a radial offset position that is a distance of at least about one quarter of the diameter of the base of the pin measured from the center of the pin.

14. The method of claim 1, wherein the scribe cutter generates a weld interface of a width that is at least about two times the offset distance of the scribe cutter.

15. The method of claim 1, wherein the scribe cutter in operation has a rotational velocity of between about 100 rpm and 1000 rpm.

16. The method of claim 1, wherein the scribe cutter includes a taper angle greater than or equal to about 90 degrees.

17. The method of claim 1, wherein the scribe cutter is angled at between 0 and 90 degrees with respect to the vertical direction.

18. The method of claim 1, wherein the scribe cutter provides a cut depth that is less than or equal to the length of the scribe cutter.

19. The method of claim 1, wherein the cutting by the scribe cutter introduces cross-sectional cuts into the second material.

20. The method of claim 1, wherein the features are filled by the first material at a temperature that maintains a local shear stress characteristic of the solid state.

21. The method of claim 1, wherein the features are filled by the first material at a substantially uniform hydrostatic pressure.

22. The method of claim 1, wherein the weld temperature is below the melting temperature of the first material.

23. The method of claim 1, wherein the lap weld has a shear strength that is greater than that formed with an FSW tool absent the scribe cutter.

* * * * *